United States Patent [19]

Straub

[11] Patent Number: 5,273,322
[45] Date of Patent: Dec. 28, 1993

[54] PIPE COUPLING WITH U-SHAPED SPRING RING

[75] Inventor: Immanuel Straub, Wangs, Switzerland

[73] Assignee: Straub Federnfabrik AG, Wangs, Switzerland

[21] Appl. No.: 397

[22] Filed: Jan. 4, 1993

[30] Foreign Application Priority Data

Jan. 15, 1992 [CH] Switzerland .................. 109/92

[51] Int. Cl.⁵ .............................................. F16L 17/04
[52] U.S. Cl. ..................................... 285/112; 285/373
[58] Field of Search ................. 285/112, 111, 373, 105

[56] References Cited

U.S. PATENT DOCUMENTS

| | | |
|---|---|---|
| 2,512,883 | 6/1950 | Warren ............................. 285/112 |
| 3,193,311 | 7/1965 | Gordan ............................ 285/112 |
| 3,877,733 | 4/1975 | Straub . |
| 4,108,479 | 8/1978 | Straub ............................. 285/112 |
| 4,119,333 | 10/1978 | Straub . |
| 4,268,072 | 5/1981 | Straub ............................. 285/112 |
| 4,629,217 | 12/1986 | Straub ............................. 285/112 |
| 4,664,422 | 5/1987 | Straub ............................. 285/112 |
| 5,137,305 | 8/1992 | Straub ............................. 285/112 |

FOREIGN PATENT DOCUMENTS

| | | |
|---|---|---|
| 2322 | 5/1927 | Australia ............................ 285/112 |
| 546009 | 3/1932 | Fed. Rep. of Germany . |
| 1045747 | 3/1952 | Fed. Rep. of Germany . |
| 1098305 | 8/1961 | Fed. Rep. of Germany . |
| 3826114 | 2/1990 | Fed. Rep. of Germany . |
| 522162 | 7/1921 | France ............................... 285/112 |
| 1227823 | 8/1960 | France ............................... 285/112 |
| 541763 | 10/1973 | Switzerland . |

*Primary Examiner*—Eric K. Nicholson
*Attorney, Agent, or Firm*—Willian Brinks Hofer Gilson & Lione

[57] ABSTRACT

A pipe coupling includes a contractible housing 10, which receives an elastomer sealing sleeve 32 of C-shaped cross section, having sealing lips 36 extending towards each other. A meander-like spring ring 44, which is U-shaped in cross section and is provided with slots 74, is inserted in to the respective annular groove 42 in order to support the sealing lip 36 against the sleeve bar 34. Upon the contraction of the housing 10, the sleeve 32 is upended in the peripheral direction and the sealing lips 36 are brought to bear snugly against the pipe wall 55. At the same time, the spring ring 44 contracts as a result of a decrease in the width of the slots 74. The sealing lip 36 is supported by the spring ring 44 over a large area, and the flowing of material of the sleeve 32 in and through the slots 74 is prevented. The spring leg 68 projecting over the sealing lip 36 prevents any sticking of the torus 56 to the sleeve bar 34. This pipe coupling is suitable for use under high operating temperatures and large temperature changes.

9 Claims, 1 Drawing Sheet

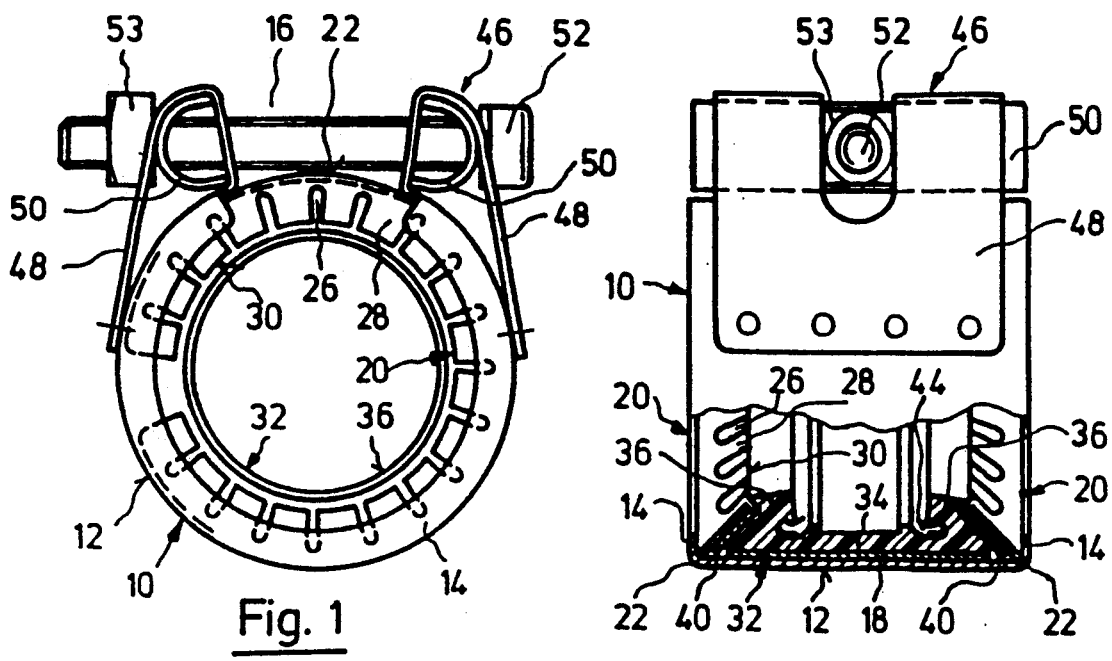
Fig. 1
Fig. 2
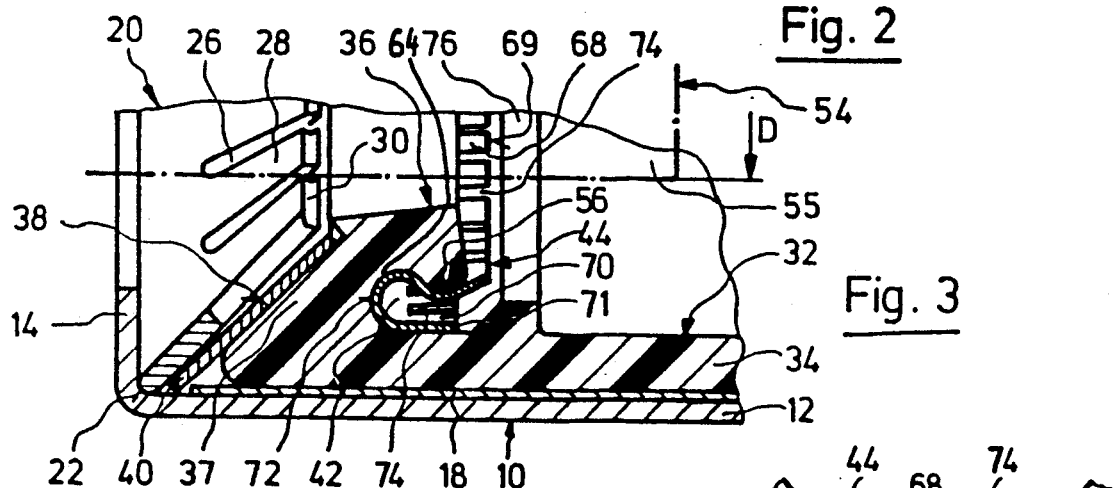
Fig. 3
Fig. 5
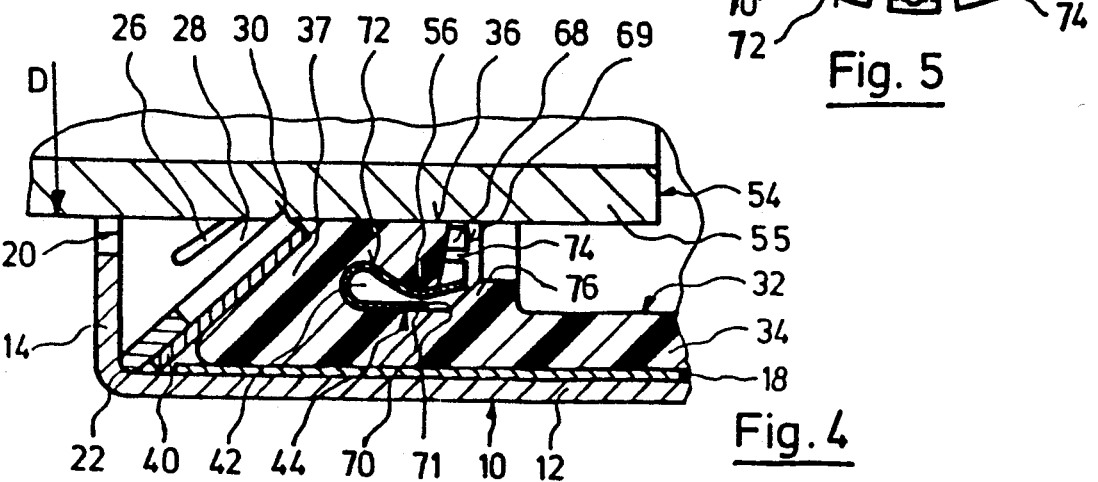
Fig. 4

PIPE COUPLING WITH U-SHAPED SPRING RING

BACKGROUND OF THE INVENTION

The present invention relates to a pipe coupling according to the preaamble of claim 1.

A pipe coupling of this type is known from DE-A-27 31 465 or from the corresponding U.S. Pat. No. 4,119,333. The sealing lips of this coupling extend toward each other, and they are included in an elastomer sealing sleeve of C-shaped cross section, which is supported against the sleeve bar by means of a coil-spring ring which is pre-tensioned in the peripheral direction. This configuration of the sealing lips support limits the upper permissible operating temperature of the pipe coupling, since, under extreme temperatures, there is a danger that thermal expansion, which acts in addition to the pressure expansion of the sleeve when the housing is compressed, will cause the sleeve material to flow between the windings of the coil-spring ring. Although the coil-spring rings are at least partially able to equalize the swelling and shrinkage of the sleeve material, flow of the sleeve material can result, under extreme operating temperatures and long periods of pressure, in the sealing capacity of the pipe coupling declining as it subsequently cools down to lower temperatures and low pressure.

In the case of pipe couplings as known, for example, from DE-A-24 28 101 or from the corresponding U.S. Pat. No. 3,877,733, each of the sealing lips is supported by means of a respective torus formed onto the sleeve bar. In this type of sleeve configuration, the flow of the material under long periods of pressure and high operating temperatures can certainly be prevented, but there is a danger of a sealing lip sticking to the respective torus, which may hinder the optimal adaptation of the sleeve to the respective operating conditions.

Based on this prior art, an object of the present invention is therefore to refine the pipe coupling of the generic type in such a way that it is suitable for use at higher operating temperatures.

SUMMARY OF THE INVENTION

According to this invention a pipe coupling of the type defined by the preamble of claim 1 is provided with at least one spring ring comprising first and second spring legs joined together by a spring bar such that the spring ring is U-shaped in cross section. The first and second spring legs define slots which radiate from the spring legs to the spring bar and overlap. The spring ring is disposed in an annular groove defined by the sealing sleeve between the sleeve bar and one of the sealing lips. The slots in the spring ring are narrowed to a selected minimal slot width upon compression of the housing to allow the spring ring to support the sealing lip over a large area.

The spring ring shown in the attached drawings, which is U-shaped in cross section and which, due to the slots, is meander-shaped, supports the sealing lip and is itself supported over a large area against the sleeve bar when the sleeve is upended due to the contraction of the housing. The spring ring is yielding, in particular transversely to the spring legs, i.e., in the peripheral direction. When the housing is compressed, the slots contract in the peripheral direction to a minimum and they reduce further in size upon volume enlargement of the sealing sleeve due to warming. The slots of the illustrated spring ring are never however completely closed by contraction, so that the pressure in the annular groove is always equal to the pressure of the medium in the pipes. The spring ring therefore adapts optimally to the respective conditions. In particular, the slots contract as the pressure expansion and thermal expansion of the sealing sleeve increase, so that, in the event of major expansion, the sealing lips are supported virtually over the entire area and no sealing material can flow through the now very narrow slots. As a result of its radial deformability and its deformability running in the peripheral direction, the spring ring equalizes the volume changes in the sleeve resulting from the temperature differences arising during operation.

In a particularly preferred embodiment of the pipe coupling, one of the spring legs is shaped to eliminate any danger of the sealing lips sticking to the sleeve bar.

Further preferred embodiments of this invention are specified in the dependent claims.

BRIEF DESCRIPTION OF THE DRAWINGS

The present invention will be described in greater detail below with reference to an illustrative embodiment represented in the drawings, in which purely diagrammatic representations are made as follows:

FIGS. 1 and 2 show the preferred embodiment of the pipe coupling according to the invention in plan view and side view, respectively, in partial cutaway;

FIGS. 3 and 4 show a part of the pipe coupling of FIGS. 1 and 2 in a longitudinal section and on an enlarged scale, before and after it has been fitted to pipes to be coupled; and FIG. 5 shows a part of the spring ring of FIGS. 3 and 4 in plan view.

DETAILED DESCRIPTION OF THE PRESENTLY PREFERRED EMBODIMENTS

The housing 10, which is represented in FIGS. 1 and 2 and which is split along its length, includes a cylindrical housing casing 12 and inwardly curved radial end walls 14. A flat insert plate 18 bridges the housing gap 16 and bears against the inner side of the housing casing 12. The insert plate 18 is aligned in relation to the housing gap 16 in such a way, of course, that the longitudinal gap of the insert plate 18 does not lie in the area of the housing gap 16, but preferably lies diametrically opposite this.

The pipe coupling further includes two frustoconical clamping rings 20, which are configured to converge in the direction of the longitudinal center of the housing 10 and which are held by their outer border 22 in the housing 10 in the throat between the housing casing 12 and the respective end wall 14. In the inner border area, the clamping rings 20 define a plurality of laminae 28 produced by slot-like recesses 26. The free end edge 30 of each of these laminae 28 thus forms a claw, which is designed to bury itself into the outer surface of the pipe ends to be interconnected and to claw on tightly there.

In the space limited by the housing 10, the insert plate 18 and the clamping rings 20, there is disposed a continuous elastomer sealing sleeve 32 of C-shaped cross section, which bears with its sleeve bar 34 against the insert plate 18 or housing casing 12 such that the sealing lips 36 of the sleeve 32 extend towards each other. The front faces 38 of the sleeve 32 are each covered by a supporting ring 40, which prevents the sleeve 32 from migrating into the recesses 26 of the clamping rings 20 under higher temperatures and pressures.

Moreover, in the annular groove 42 limited by the sleeve bar 34, the sealing lip 36 in question and the sealing lip root 37, a meander-like spring ring 44 of U-shape cross section is present in order to support the sealing lip 36 in place with respect to the sleeve bar 34.

The housing 10 further includes a closure 46, comprising clamping tongues 48 welded onto the housing 10, clamping bars 50, which are of U-shaped cross section and are enclosed by said clamping tongues, and a clamping screw 52 with a nut 53. The clear width of the pipe coupling (housing 10, sleeve 32, insert plate 18, clamping rings 20, supporting rings 40, spring rings 44) is so amply proportioned in the opened state represented in FIGS. 1 to 3 that, in relation to the outer diameter of the pipes 54 indicated in FIG. 3 by an arrow D, an overmeasure is in any event present, so that the coupling can be slid easily over the one pipe 54 and, following laying of the pipes 54, can also be slid across onto the other pipe end. By tightening the clamping screw 52, the inner diameter of the housing 10 can be reduced as in the case of a pipe clip, the housing gap 16 being diminished and the insert plate 18 plunging further and further into the housing 10. In this event, the sleeve 32 is upended in the peripheral direction, the spring rings 44 and the tori 56 formed onto the sealing lips 36 bringing the sealing lips 36 snugly to bear against the pipe wall 55, as can be seen from FIG. 4. At the same time, there is also a contraction in the openended clamping rings 20, which are configured such that they form approximately one winding when the housing 10 is fully compressed. Upon the contraction of the housing 10, the free end edges 30 of the laminae 28 are therefore anchored in the pipe wall 55 as a result of the axial and radial support offered by the clamping rings 20 against the housing 10. Consequently, not only is the pipe coupling fixed to the pipes 54, but also the pipes 54 are prevented from slipping out of the pipe coupling as a result, for example, of axial forces generated by inner pressure of the pipe medium. In FIGS. 3 and 4, only the one end area of the pipe coupling is shown in each case, the other, axially opposite, end area being, of course, of similar configuration and functioning identically.

As can be particularly clearly seen from FIG. 3, the torus 56 is formed onto the sealing lip 36 in the end area of the sealing lip 36 adjoining the free end, on the side facing the sleeve bar 34, so that the annular groove 42 exhibits a type of undercut.

The spring ring 44, of continuous configuration and U-shaped cross section, includes a radially inner spring leg 68, a radially outer spring leg 70, and a spring bar 72 joining the two together. When the spring ring 44 is inserted into the annular groove 42, the spring bar 72 bears against the base area 64 and the radially outer spring leg 70 terminates, when viewed in the axial direction, at approximately the same height as the sealing lip 36. The inner spring leg 68 facing the sealing lip 36 is longer in the axial direction, however, so that it projects out of the annular groove 42 over the sealing lip 36. The outer spring leg 70 bears over a large area against the sleeve bar 34. The spring bar 72 is curved over an angle of more than 180°, preferably by approximately 210°, and the radially inner spring leg 68 exhibits a counter-directed curvature, so that it partially embraces the torus 56 of the sealing lip 36. The spring ring 44 thereby prevents the sealing lip 36 or the torus 56 from being able to touch the sleeve bar 34 when the housing 10 is contracted (FIG. 4) and from being able to stick to or vulcanize with said sleeve bar at high temperatures.

The spring ring 44 defines a plurality of slots 74, which, viewed in the peripheral direction, radiate alternately from the border 69 of the inner spring leg 68 and from the border 71 of the outer spring leg 70 and overlap in the area of the spring bar 72, as can be particularly clearly seen from FIG. 5. The spring ring 44 thus exhibits a meander shape and can be upended in the peripheral direction.

The size of the spring ring 44 is selected such that, when the housing 10 is not braced, it lies without pretensioning in the annular groove 42 (FIG. 3). When the housing 10 is contracted, the width of the slots 74 likewise contract as a result of the upending of the spring ring 44. The width of the slots 74 is now selected such that the slots 74, when the housing 10 is braced, are narrowed down to a pre-specified slot width but are still present and this minimal slot width is determined by the fact that, upon further contraction of the slots 74 due to thermal expansion under the highest permissible operating temperature, the slots 74 are still present insofar as the now contracted annular groove 42 remains in communicating connection with the space situated on the other side of the torus 56. This configuration of the spring ring 44 supports the sealing lip 36 with the torus 56 over the largest possible area against the sleeve bar 34.

Annular ribs 76, which are pre-mounted in front of the annular grooves 42 and overlap these, are formed onto the sleeve bar 34, which annular ribs on the one hand, in the pressureless state or in a vacuum, prevent the sleeve bar 34 from detaching itself from the insert plate 18 and make it impossible, on the other hand, for the spring ring 44 to slide inadvertently out of the annular groove 42.

Irrespective of the ageing of the elastomer material of the sleeve 32, the sealing lip 36 is always held securely by the spring ring 44 to bear snugly against the pipe wall 54. This is the case even in the event of a possible vacuum in the pipes 54 and in the interior, which is linked via the pipe joint to said pipes, of the pipe coupling. Since the adhesion of the sealing lip 36 to the sleeve bar 34 and the flow of material of the sleeve 32 at high temperatures is prevented, higher operating temperatures are permissible for the pipe coupling described above than in the case of known pipe couplings.

It is also of course conceivable to configure only the radially outer spring leg or both spring legs to project over the sealing lip 36. It is also possible to form a torus supporting the respective sealing lip onto the sleeve bar. It is also conceivable for the torus-side spring leg to terminate before the torus, so that the torus comes to bear against the other, longer spring leg when the housing is compressed.

The spring ring can be configured as a closed ring or as an open ring consisting of a meander-shaped strip, the ends of which ring overlap or, in the tensioned state of the pipe coupling, butt against each other. The latter embodiment facilitates the fitting of the spring ring into the sleeve. In addition, considerable material and cost savings are in this case possible.

I claim:

1. In a pipe coupling of the type comprising: an elastomer sealing sleeve of C-shaped cross section, said sealing sleeve defining a sleeve bar and a plurality of sealing lips supported on the sleeve bar to extend toward one another; a contractible housing enclosing the sealing sleeve and defining a longitudinal gap; said housing comprising a closing mechanism and an insert plate inserted between the sealing sleeve and the housing to bridge the longitudinal gap; said sealing lips, prior to compression of the housing, defining an inside dimension greater than an outside dimension of pipes to be coupled, and upon compression of the housing being able to be upset in a peripheral direction and thereby pressed snugly against respective pipes; the improvement comprising:

- at least one spring ring comprising first and second spring legs joined together by a spring bar such that the spring ring is U-shaped in cross section;
- said first and second spring legs each defining slots which radiate from the spring legs to the spring bar, said slots of said first spring leg overlapping said slots of said second spring leg at said spring bar;
- said spring ring disposed in an annular groove defined by the sealing sleeve between the sleeve bar and one of the sealing lips;
- said slots in the spring ring being narrowed to a selected minimal slot width upon compression of the housing to allow the spring ring to support the sealing lip over a large area.

2. The pipe coupling as claimed in claim 1, wherein at least one of the spring legs protrudes axially out of the annular groove and over a free end defined by the sealing lip.

3. The pipe coupling as claimed in claim 2, wherein the sealing lip, when the housing is compressed, is supported on the sleeve bar by means of a torus, which torus bears against the spring leg protruding over the free end of the sealing lip.

4. The pipe coupling as claimed in claim 3, wherein the torus is formed on said sealing lip at the end of the sealing lip and facing the sleeve bar, and wherein one of the first and second spring legs positioned adjacent to the sealing lip embraces the torus.

5. The pipe coupling as claimed in claim 1, wherein a circumferential angular rib is formed on the sleeve bar on an inner side, and wherein the annular rib is positioned adjacent to the annular groove.

6. The pipe coupling as claimed in claim 1, wherein the spring ring is configured as an open ring.

7. The pipe coupling as claimed in claim 2, wherein the spring leg that protrudes axially out of the annular groove is positioned adjacent the sealing lip.

8. In a pipe coupling of the type comprising: an elastomer sealing sleeve of C-shaped cross section, said sealing sleeve defining a sleeve bar and a plurality of sealing lips supported on the sleeve bar to extend toward one another; a contractible housing enclosing the sealing sleeve and defining a longitudinal gap; said housing comprising a closing mechanism and an insert plate inserted between the sealing sleeve and the housing to bridge the longitudinal gap; said sealing lips, prior to compression of the housing, defining an inside dimension greater than an outside dimension of pipes to be coupled, and upon compression of the housing being able to be upset in a peripheral direction and thereby pressed snugly against respective pipes; the improvement comprising:

- at least one spring ring comprising first and second spring legs joined together by a spring bar such that the spring ring is U-shaped in cross section;
- said first and second spring legs each defining slots which radiate from the spring legs to the spring bar and overlap;
- said spring ring disposed in an annular groove defined by the sealing sleeve between the sleeve bar and one of the sealing lips;
- said slots in the spring ring being narrowed to a selected minimal slot width upon compression of the housing to allow the spring ring to support the sealing lip over a large area;
- wherein at least one of the spring legs protrudes axially out of the annular groove and over a free end defined by the sealing lip;
- wherein the sealing lip, when the housing is compressed, is supported on the sleeve bar by means of a torus, which torus bears against the spring leg protruding over the free end of the sealing lip.

9. The pipe coupling as claimed in claim 8, wherein the torus is formed on said sealing lip at the end of the sealing lip and facing the sleeve bar, and wherein one of the first and second spring legs adjacent to the sealing lip embraces the torus.

* * * * *

UNITED STATES PATENT AND TRADEMARK OFFICE
CERTIFICATE OF CORRECTION

PATENT NO. : 5,273,322
DATED : December 28, 1993
INVENTOR(S) : Immanuel Straub

It is certified that error appears in the above-indentified patent and that said Letters Patent is hereby corrected as shown below:

In column 3, line 28, delete "openended" and substitute therefor --open-ended--.

Column 5, line 40, delete "angular" and substitute therefor --annular--,
Column 6, line 22, delete "each".

Signed and Sealed this

Twenty-third Day of August, 1994

Attest:

BRUCE LEHMAN

Attesting Officer    Commissioner of Patents and Trademarks